United States Patent [19]
Payton et al.

[11] Patent Number: 5,390,741
[45] Date of Patent: Feb. 21, 1995

[54] REMEDIAL TREATMENT METHODS FOR COAL BED METHANE WELLS

[75] Inventors: Richard A. Payton; Daniel P. Sparks, Jr., both of Birmingham, Ala.; Robert F. Singleton, Jr., Spring, Tex.; Terry L. Valentine, Alabaster, Ala.

[73] Assignees: Halliburton Company, Duncan, Okla.; Taurus Exploration, Inc., Birmingham, Ala.

[21] Appl. No.: 171,085

[22] Filed: Dec. 21, 1993

[51] Int. Cl.⁶ .................. E21B 37/00; E21B 43/27
[52] U.S. Cl. .................. 166/284; 166/307; 166/309; 166/312
[58] Field of Search .............. 166/281, 284, 307, 308, 166/309, 312

[56] References Cited

U.S. PATENT DOCUMENTS

| | | | |
|---|---|---|---|
| 3,482,633 | 12/1969 | Stipp et al. | 166/284 |
| 3,547,197 | 12/1970 | Chevalier et al. | 166/284 |
| 4,391,327 | 7/1983 | De Carlo | 166/307 |
| 4,913,237 | 4/1990 | Kutas | 166/308 |
| 5,014,788 | 5/1991 | Puri et al. | 166/307 X |
| 5,229,017 | 7/1993 | Nimerick et al. | 166/308 X |
| 5,249,627 | 10/1993 | Harms et al. | 166/308 |

Primary Examiner—George A. Suchfield
Attorney, Agent, or Firm—C. Clark Dougherty, Jr.; Robert A. Kent

[57] ABSTRACT

Methods of remedially treating coal bed methane wells to enhance the production of methane therefrom are provided. The methods basically comprise pumping a clean out fluid into the well and into producing zones communicated with the well by perforations therein. The pumping of the clean out fluid is continued while adding perforation sealers thereto to thereby seal perforations and producing zones which are not plugged and to divert the clean out fluid into perforations and producing zones which are partially plugged. An aqueous acid solution is next pumped into the partially plugged perforations and producing zones whereby acid soluble solid materials in the perforations and producing zones are dissolved. The well is shut in, reverse flowed and then returned to production.

20 Claims, 6 Drawing Sheets

REMEDIAL TREATMENT METHODS FOR COAL BED METHANE WELLS

BACKGROUND OF THE INVENTION

1. Field of the Invention

This invention relates to the remedial treatment of coal bed methane wells to enhance the production of methane therefrom.

2. Description of the Prior Art

The production of methane from subterranean coal beds by way of wells drilled into the coal beds has become more common in recent years. Such coal beds contain adsorbed hydrocarbon gases consisting primarily of methane (about 95%) with the remainder being ethane, propane, higher homologs and sometimes $CO_2$ and $N_2$. The coal beds are reservoirs for a great amount of gas which can be produced by way of well bores which are drilled and completed using conventional techniques. The coal beds usually contain water which when produced causes pressure to be reduced and the methane and other gases to be desorbed from the coal and produced along with the water.

While different stimulation techniques have been utilized by the industry to enhance production of methane from coal bed wells, conventional hydraulic fracturing techniques are the most common. In hydraulic fracturing, a fracturing fluid such as an aqueous gel or foam is pumped through a well bore and into a producing zone in a coal seam penetrated by the well. The fracturing fluid is pumped at a rate and resulting pressure sufficient to create fractures in the coal seam. The fractures are extended by continued pumping, and typically, a proppant material such as sand is mixed with the fracturing fluid and carried into the fractures thereby. When the pumping is stopped and the pressure on the producing zone is released, the induced fractures are propped open by the proppant material thereby providing flow channels through which produced fluids flow to the well bore.

As mentioned, the produced coal bed fluids generally include water in addition to the desorbed methane and other gases. The water contains dissolved minerals, and when the water is subjected to pressure and temperature changes as it flows through the coal formation and through perforations communicating the formation with the well bore, the minerals may precipitate and produce scale deposits within the formation and in the perforations. Such scale deposits often partially or totally plug formation flow channels as well as the perforations whereby the flow of produced fluids is severally restricted or stopped. In addition to the scale deposits which precipitate from the produced water, damage to the coal bed producing zones often occurs as a result of drilling the well bore and the performance of completion and stimulation procedures. For example, debris such as filter cake from the drilling fluid utilized during the drilling of the well bore and unbroken gels utilized in completion and stimulation techniques are often left in the coal formation. Such debris can partially plug the near well portions of producing zones and reduce production.

Most coal bed methane wells penetrate a plurality of coal seams which include one or more producing zones communicated with the well by perforations therein. The production of methane from all of the producing zones is generally necessary for a particular well to be economically attractive. However, after a coal bed methane well has been produced for an initial period of time, the above mentioned drilling, completion and stimulation debris left in the coal formations and the mineral scale deposits as well as coal fines which migrate with the produced fluids often combine to plug the perforations and producing zones. Heretofore, in order to perform remedial treatments to unplug the perforations and producing zones, it has been necessary to isolate the producing zones using packers and the like which involves considerable time and expense. Also, the remedial treatments carried out have often been ineffective in removing the scale deposits and other plugging solid materials from the producing zones and perforations.

Thus, there is a need for improved remedial treatment methods for coal bed methane wells which effectively enhance production and are relatively inexpensive to carry out.

SUMMARY OF THE INVENTION

By the present invention, improved methods of remedially treating coal bed methane wells to enhance the production of methane therefrom are provided which meet the needs described above and overcome the shortcomings of the prior art. The treating methods comprise the continuous pumping of treating fluids into the well and into the producing zones thereof by way of the perforations. Specifically, a clean out fluid is pumped into the well and into the producing zones by way of unplugged perforations and perforations which are readily opened by the pressure differential exerted thereon by the clean out fluid. The pumping of the clean out fluid is continued while adding perforation sealers to the fluid to seal the open perforations and producing zones and to divert the clean out fluid to perforations and producing zones which are plugged by solid materials whereby at least some of the solid materials are cleaned out of the perforations and the producing zones communicated therewith. The clean out fluid is next displaced through the well bore and into the producing zones by an aqueous acid solution which is pumped into the partially plugged perforations and producing zones whereby the acid solution dissolves acid soluble solid materials and scale deposits in the perforations and producing zones. Following the pumping of the aqueous acid solution, the sequence of pumping clean out fluid, introducing additional perforation sealers therein and pumping acid solution can be continuously repeated as required to open and clean out all of the perforations and producing zones communicated therewith. The well is then reverse flowed whereby the clean out fluid, the perforation sealers, solid materials suspended in the clean out fluid and spent acid solution are removed from the well.

It is, therefore, a general object of the present invention to provide improved remedial treatment methods for coal bed methane wells.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 6 is a schematic illustration similar to FIGS. 3, 4 and 5 showing the production logs for the fourth coal seam penetrated by the well before and after the remedial treatment of the present invention.

DESCRIPTION OF PREFERRED EMBODIMENTS

The coal bed methane and water wells for which the remedial treatment methods of the present invention are particularly suitable are those wells penetrating one or more coal seams which include one or more producing zones communicated with the well by perforations therein. As mentioned above, most economically advantageous coal bed methane wells penetrate a plurality of individual coal seams, each of which includes two or more producing zones connected to the well bore by a plurality of perforations. The perforations usually extend through casing cemented in the well bore and through the cement sheath which bonds the casing to the walls of the well bore.

After a coal bed well of the type described above has been drilled, completed and stimulated such as by hydraulic fracturing, the well is produced. As mentioned, most coal bed wells produce water and desorbed hydrocarbon gases. The hydrocarbon gases are comprised of about 95% methane with the remainder being made up of ethane, propane, higher homologs and sometimes $N_2$ and $CO_2$. The term "methane" is used herein to include methane as well as the other higher homologs and $N_2$ and $CO_2$ produced as a result of the degasification of subterranean coal.

The water and methane gas produced from the various producing zones communicated with the well by perforations flow through flow channels in the coal seams, through the perforations and into the well bore. A string of tubing is generally disposed in the well bore which extends to near the bottom thereof, and a water pump is connected to the bottom end of the tubing. The water which enters the well bore by way of the perforations flows downwardly to the bottom of the well bore from where it is pumped up the string of tubing and out of the well to a disposal location. The methane gas entering the well bore flows upwardly through the annulus between the tubing string and casing to the surface where it is recovered and transported, such as by pipeline, to a point of further processing. As mentioned, the produced water contains dissolved minerals which may precipitate out of the water as it flows through the coal formation and perforations into the well bore due to temperature and pressure changes. The precipitation of the minerals forms scale deposits in the producing zones of the coal formation and in the perforations.

In addition to the formation of scale deposits in the producing zones and perforations, coal beds generally also include coal fines which migrate with produced fluids and contribute to plugging the near well producing zones and perforations. Also, as mentioned previously, debris such as drilling fluid filter cake and completion and stimulation gels left in the producing zones when the wells were drilled and/or stimulated contribute to such plugging. The build-up of the scale deposits and other solid materials eventually restricts the flow of the produced fluids into the well bore and production decreases to the point where the well is no longer economical to operate. It is at that point when the producing zones and perforations are partially or totally plugged by solid materials that the remedial treatment methods of the present invention are utilized. The methods are effective in removing most if not all of the various solid materials mentioned above thereby restoring and often improving the production of methane from the treated well.

In accordance with the improved methods of this invention, a clean out fluid is pumped into the well and into the producing zones by way of the perforations. After an initial volume of the clean out fluid has been pumped, e.g., from about 5,000 gallons to about 25,000 gallons, perforation sealers such as resilient ball sealers are added to the clean out fluid as it is being pumped. The perforation sealers function to seal off the perforations and the producing zones communicated with such perforations which are not plugged and which readily accept the pumped clean out fluid. The sealing of such open perforations diverts the pumped clean out fluid to perforations and producing zones which are plugged or partially plugged by solid materials of the type mentioned above. The pressure differential of the pumped fluid across the plugged perforations causes them to be at least partially unplugged, i.e., at least a portion of the solid materials are cleaned out of the perforations and the near well producing zones. As is well understood by those skilled in the art, the particular number of the perforation sealing members added to the clean out fluid is carefully controlled using well known techniques to divert the pumped clean out fluid to the plugged or partially plugged perforations and producing zones without shutting off all of the perforations. The amount of clean out fluid pumped containing perforation sealers is generally an amount in the range of from about 5,000 gallons to about 25,000 gallons. The clean out fluid is next displaced with an aqueous acid solution which is pumped into the well and into the partially plugged perforations and producing zones whereby the acid solution reacts with and dissolves acid soluble solid materials in the perforations and producing zones. The amount of aqueous acid pumped is generally an amount in the range of from about 500 gallons to about 2,500 gallons.

The combination of the clean out fluid flowing through the partially plugged perforations and producing zones followed by the contact of the solid materials plugging the perforations and producing zones with acid which dissolves the solid materials enhances the subsequent production of methane and water therefrom.

In a preferred method of this invention, the steps of pumping an initial amount of clean out fluid, pumping additional clean out fluid containing perforation sealers and then pumping an aqueous acid solution are continuously repeated at least once after the initial pumping. Most preferably, those three steps are repeated at least three times or more as required to unplug all of the perforations and coal formation producing zones in the well. It is also preferred that after the aqueous acid solution is pumped for the last time, an additional amount of clean out fluid in the range of from about 5,000 gallons to about 50,000 gallons is pumped through the perforations which remain unsealed by the perforation sealers. Those perforations and the producing zones communicated therewith which remain unsealed at the end of the treatment are the perforations and producing zones which are the most plugged with solid materials. Consequently, a relatively large amount of additional clean out fluid is pumped through those perforations and into the producing zones communicated therewith.

After the various fluids of the entire treatment have been continuously pumped into the well, the pumping is terminated and the well is shut in for a period of time, preferably a time in the range of from about 0 hours to about 24 hours. The well is then reverse flowed whereby the clean out fluid, the perforation sealers, solid materials suspended in the clean out fluid and spent acid solution are removed from the well.

While various types of clean out and aqueous acid fluids can be utilized in accordance with the methods of this invention, gas energized fluids are preferred, i.e., fluids containing some amount of gas whereby when the well is reverse flowed, the gas expands and facilitates the removal of the liquids and solid materials from the well. A particularly preferred clean out fluid for use in accordance with the present invention is an aqueous foam having a quality of at least about 60, and preferably from about 70 to about 85, most preferably about 80. Foam quality is a measure of the volume of gas to the total volume of fluid under downhole pressure and temperature conditions. The preparation and use of aqueous foams having qualities in the ranges mentioned above are well known to those skilled in the art and such foams have commonly been used as well completion and stimulation fluids. The use of aqueous foams for carrying out the methods of this invention reduces the amount of aqueous liquid that contacts the treated coal formations which can be damaging thereto, have excellent capacity to carry suspended solid materials removed from the perforations and producing zones, and as mentioned, are energized by the expansion of the gas when the well is reverse flowed.

The foamed clean out fluid which is preferably utilized in accordance with this invention is basically comprised of water and an inert gas such as nitrogen or carbon dioxide, preferably nitrogen. In order to facilitate the formation of the foam and stabilize it, the foam preferably includes a foaming agent, i.e., a foam promoting and stabilizing surface active agent. The surface active agent can be cationic, anionic or nonionic compounds, such as for example, betaines, sulfated alkoxylates, alkylquaternary amines, ethoxylated linear alcohols and the like. In order to provide additional stability to the foam, a gelling agent can be mixed with the aqueous liquid prior to the formation of the foam. The gelling agent can comprise, for example, hydratable polymers such as polysaccharides and derivatives thereof. Natural hydratable polysaccharide polymers include quar gum and derivatives thereof, cellulose and derivatives thereof and others. Hydratable synthetic polymers and copolymers which can be utilized include polyacrylate, polymethacrylate, polyacrylamide and others. The most preferred gelling agent is hydroxyethylcellulose, and it is generally combined with the aqueous liquid in an amount of 30 pounds of gelling agent per 1000 gallons of aqueous liquid used.

The aqueous acid solution is also preferably foamed with a gas as described above. The aqueous acid portion of the foam is an aqueous solution of an acid such as hydrochloric acid, hydrofluoric acid, acetic acid and others. Preferably, the aqueous acid solution contains an acid or mixture of acids in an amount in the range of from about 7.5% to about 28% by weight of solution. A 15% by weight hydrochloric acid solution is the most preferred.

When an energized clean out fluid and an energized aqueous acid solution are utilized in accordance with the present invention, the fluids are usually prepared on-the-fly by injecting the gas into a pressurized flowing stream of the base aqueous liquid. When the energized fluid is a foam, the on-the-fly procedure followed is usually that the foaming agent is first injected into a pressurized stream of the aqueous liquid, and thereafter, the gas utilized is injected into the aqueous liquid-foaming agent mixture. The turbulence generated by the flow of the combined stream through the well bore causes the foam to be created prior to contacting the subterranean coal formations.

As mentioned, the clean out fluid and aqueous acid fluid are continuously sequentially pumped without stopping from the beginning of the treatment to the end thereof when the pumping is terminated and the well is shut in. The fluids are pumped at a high rate in the range of from about 30 to about 100 barrels per minute, preferably at about 60 barrels per minute. Adequate pump pressure is used to force the fluids into the coal formation producing zones by way of the perforations. The surface pressure at the pumps will typically be in the range of from about 1,500 to about 3,500 psig.

Both the clean out fluid and the aqueous acid fluid can include additional additives which produce beneficial results. For example, the aqueous acid solution can include known additives for preventing the precipitation of iron and other metals from the spent acid solution.

The perforation sealers utilized are preferably resilient ball sealers. While the size of the ball sealers used can vary, a typical size is $\frac{7}{8}''$ in diameter which readily seals a 0.$\frac{3}{8}''$ perforation.

In order to further illustrate the methods of the present invention the following example is given.

EXAMPLE

Figure 1:
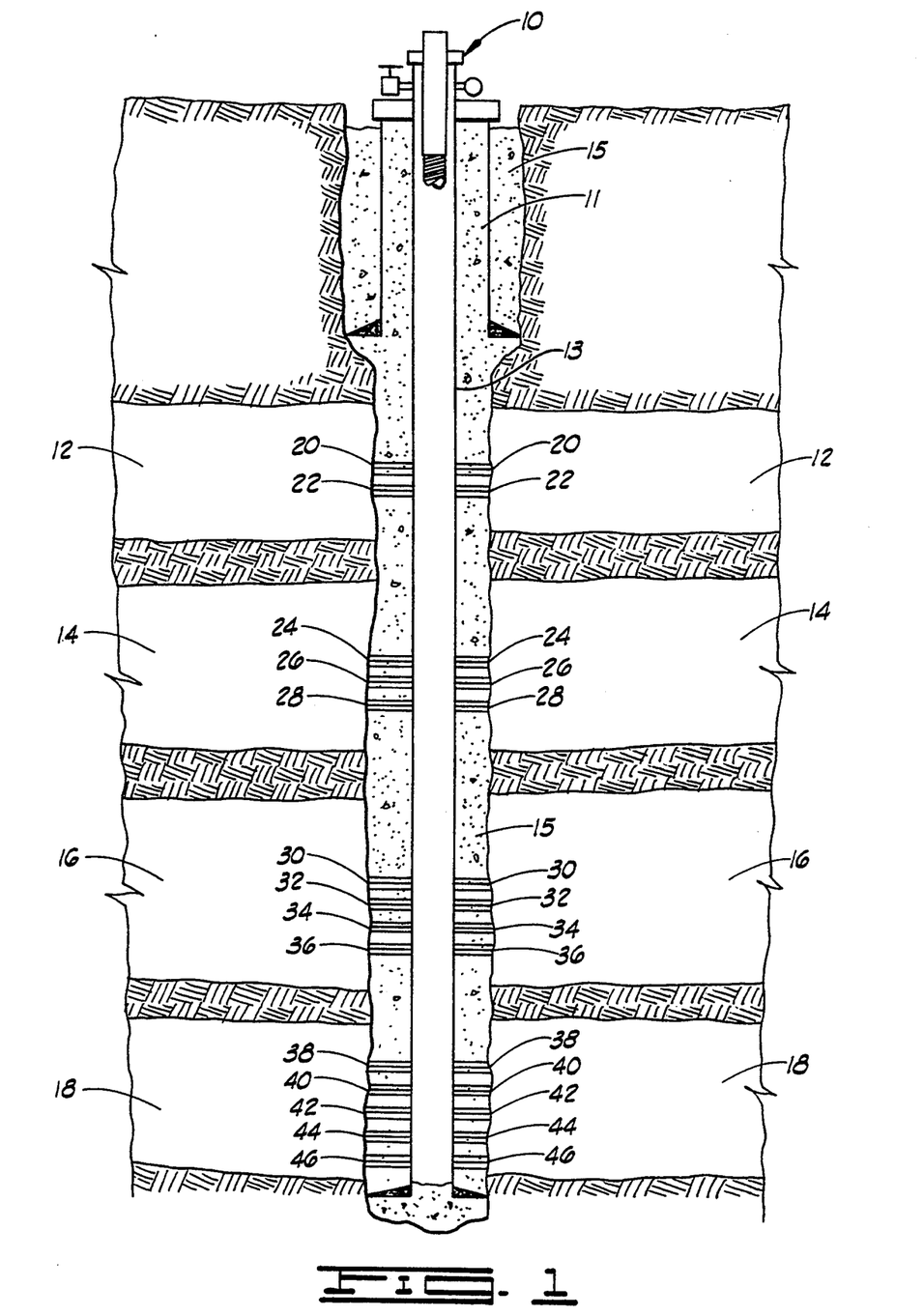
FIG. 1 is a side cross-sectional representation of a coal bed methane well penetrating four subterranean coal seams which are communicated with the interior of the well bore by a plurality of perforations.

A coal bed methane well in Tuscaloosa County, Alabama, which is schematically illustrated in FIG. 1, was remedially treated in accordance with the present invention. As shown in FIG. 1, the well, designated by the numeral 10, penetrates four coal seams 12, 14, 16 and 18. The well 10 includes surface pipe 11 and casing 13 cemented in a well bore by a cement sheath 15. The top coal seam 12 (the Cobb seam) is at the interval of from 950' to 1,200'. A first producing zone is perforated by a group of perforations 20 at from 1,022' to 1,025', and a second producing zone is perforated by a group of perforations 22 at from 1,038' to 1,041'. The perforations 20 and 22 as well as the other perforations in the well 10 extend through the casing 13 and through the cement sheath 15 into the producing zones.

A second coal seam 14 known as the Pratt seam contains three producing zones communicated with the well 10 by perforation groups 24, 26 and 28. The Pratt seam is at the interval from 1,400' to 1,650' and the three groups of perforations 24, 26 and 28 are at the intervals from 1,475' to 1,479', from 1,509' to 1,513' and from 1,619' to 1,622', respectively.

A third coal seam known as the Mary Lee seam is at the interval from 2,200' to 2,450' and includes four producing zones communicated with the well bore by four groups of perforations 30, 32, 34 and 36 at from 2,245' to 2,251', from 2,275' to 2,279', from 2,288' to 2,294' and from 2,365' to 2,370', respectively.

The fourth coal formation known as the Black Creek seam is at from 2,750' to 3,000', and it contains five producing zones communicated with the well 10 by perforation groups 38, 40, 42, 44 and 46. The perforations 38 are from 2,821' to 2,825', the perforations 40 are from 2,829' to 2,833', the perforations 42 are from 2,871' to 2,878', the perforations 44 are from 2,887' to 2,890' and the perforations 46 are from 2,913' to 2,916'. The well 10 includes a total of 552 perforations.

Figure 2:
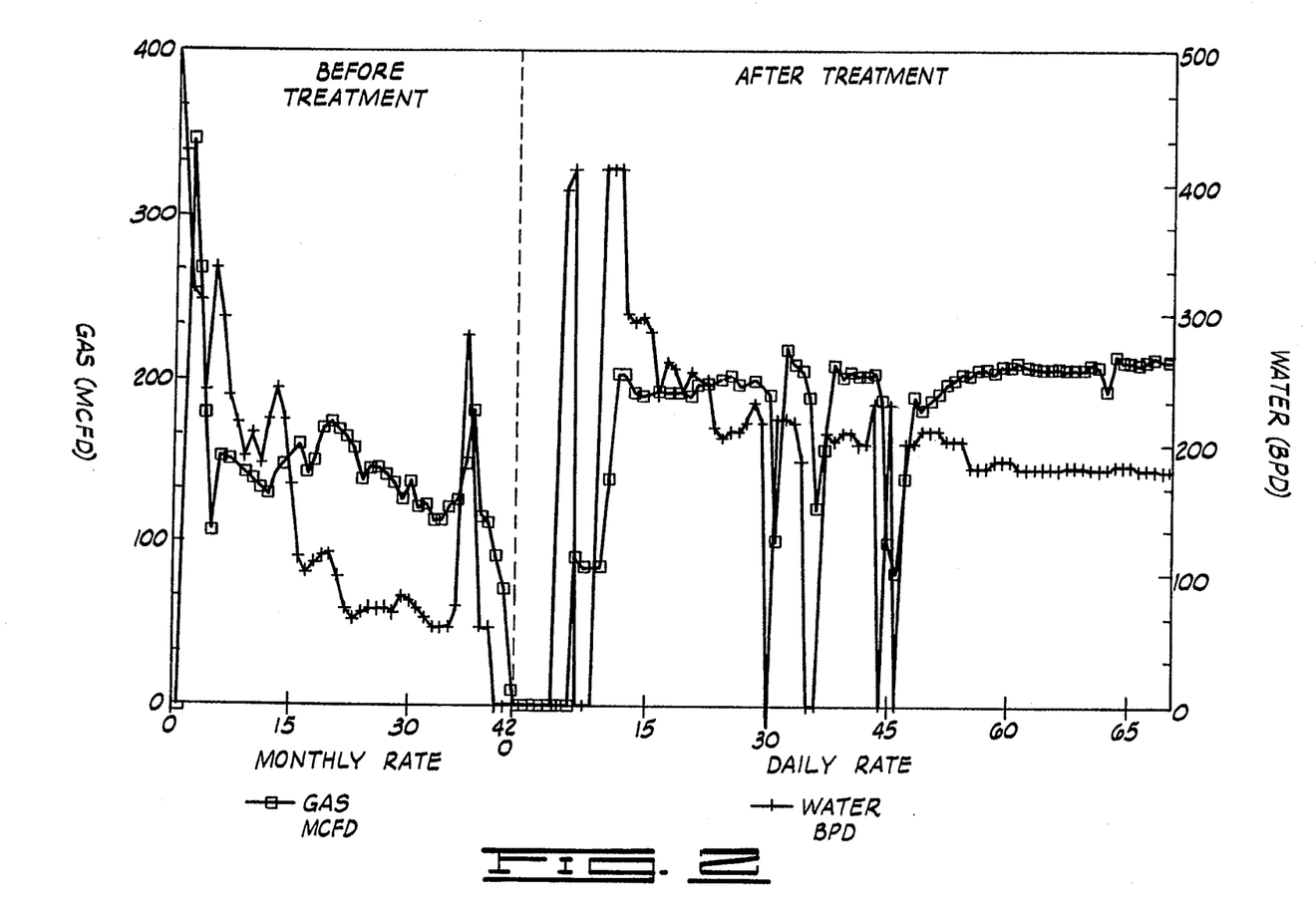
FIG. 2 is a graph illustrating the water and methane production from a coal bed methane well before and after the remedial treatment of the present invention.
Figure 3:
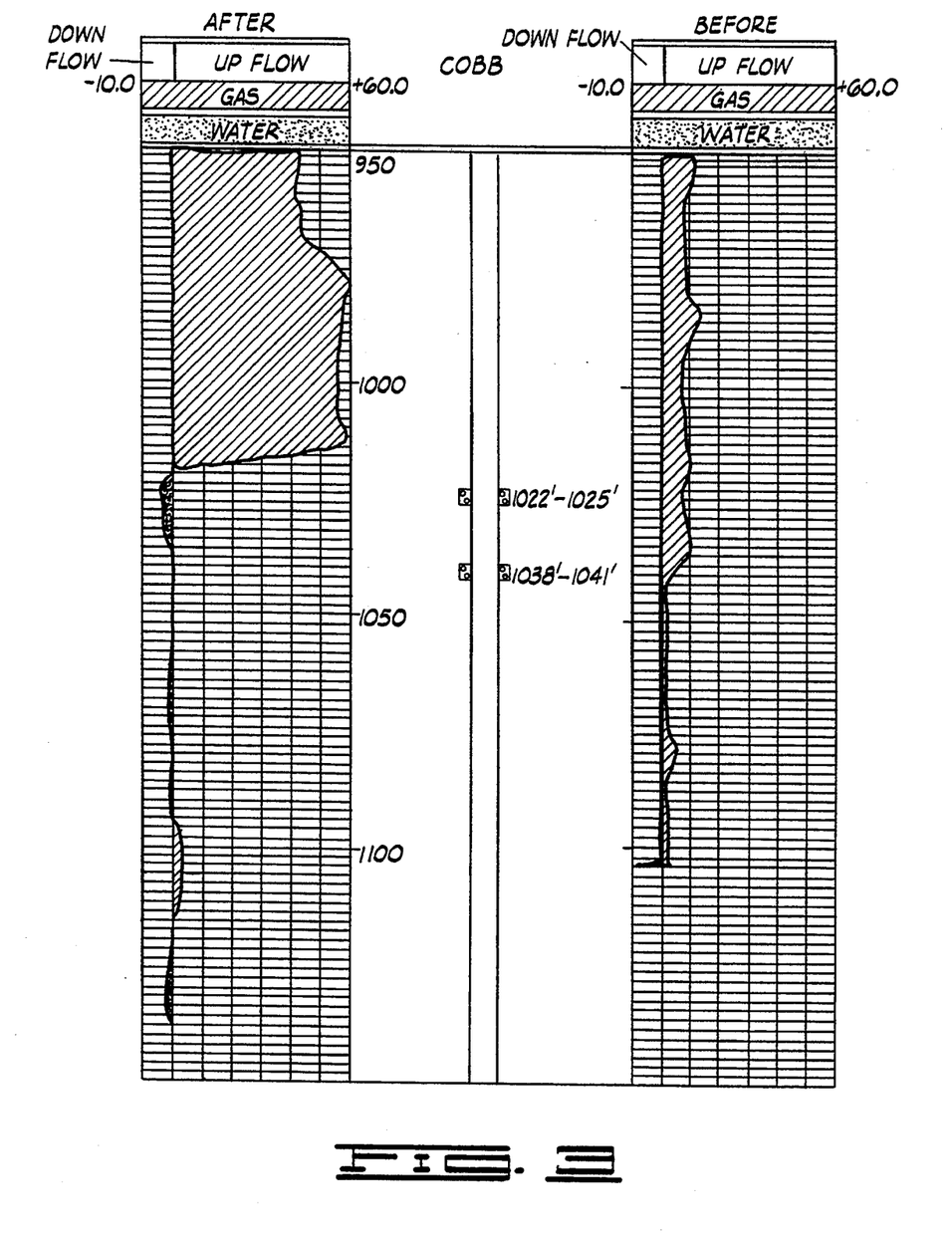
FIG. 3 is a schematic illustration of a part of a coal bed well and the methane and water production logs for the first coal seam penetrated by the well before and after the remedial treatment of the present invention.
Figure 4:
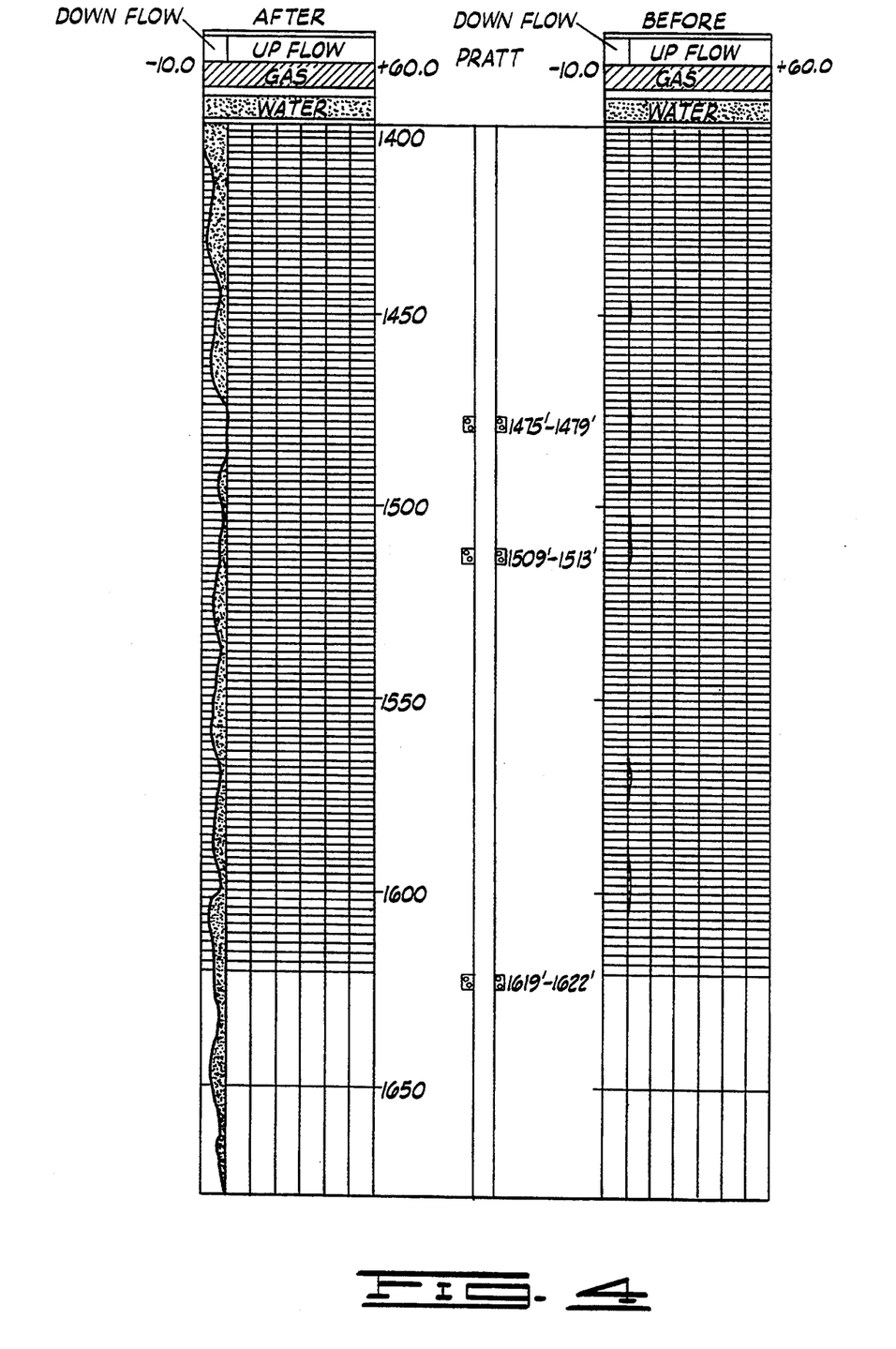
FIG. 4 is a schematic illustration similar to FIG. 3 showing the methane and water production logs for the second coal seam penetrated by the well before and after the remedial treatment the present invention.
Figure 5:
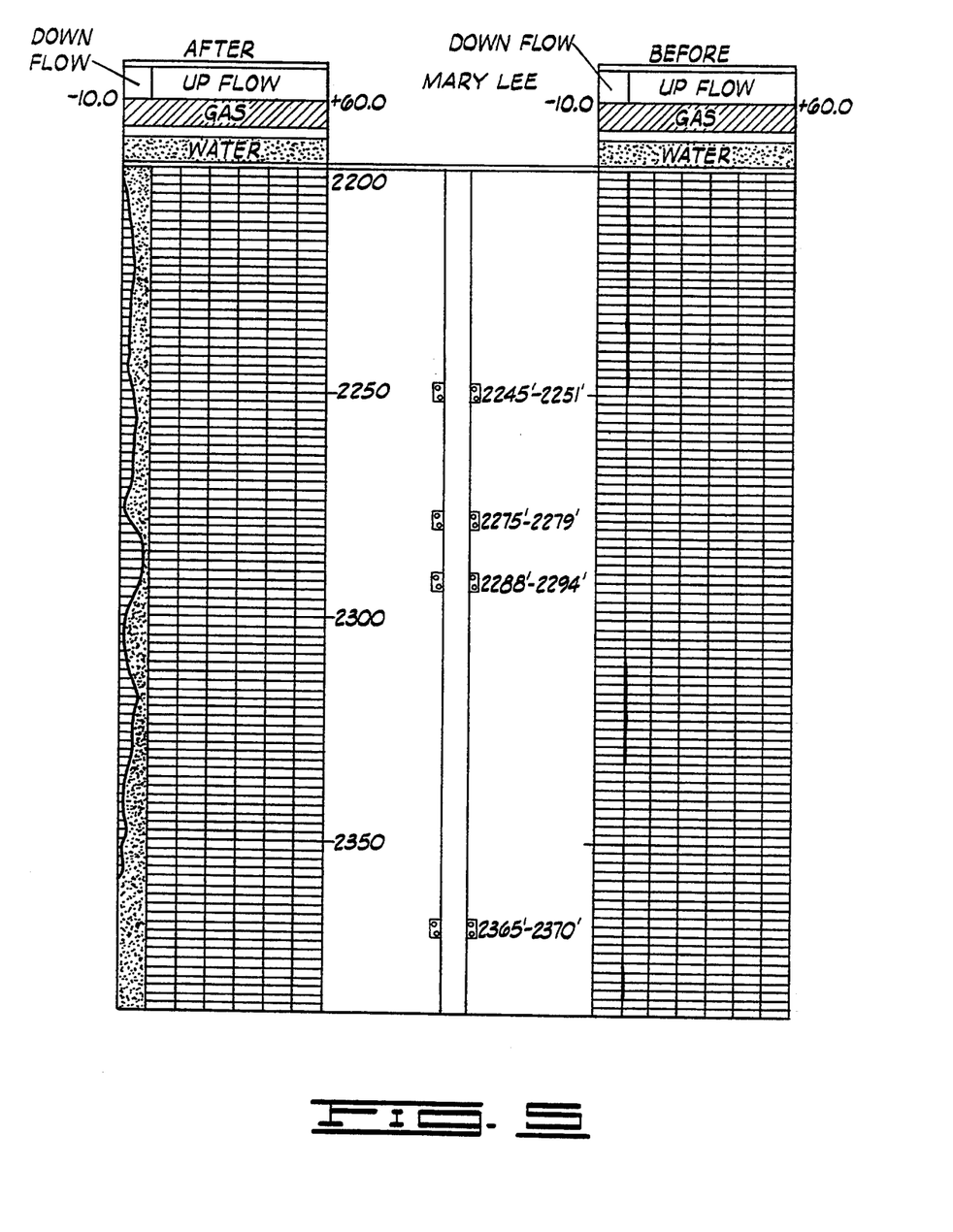
FIG. 5 is a schematic illustration similar to FIGS. 3 and 4 showing the production logs for the third coal seam penetrated by the well before and after the remedial treatment of the present invention.

The various producing zones in the well were all initially hydraulically fractured. As shown in FIG. 2, the well was produced for a time period of about 42 months, at the end of which the production of both water and gas was in significant unnatural decline. At that time, the well was treated in accordance with the present invention as follows.

After breaking down the formation by pumping fresh water into the formation, the fluids set forth in Table I below were continuously pumped in the sequence, in the amounts and at the rates indicated. The times when resilient ball sealers were introduced into the well and the number of such sealers are also given in Table I.

TABLE I

| Type of Fluid and Sequence Pumped | Pumping Rate, Barrels per Minute | Volume Pumped, Gallons | Number of Ball Sealers[3] Added to Fluid |
| --- | --- | --- | --- |
| Aqueous Foam Clean Out Fluid[1] | 60 | 10,000 | 0 |
| Aqueous Foam Clean Out Fluid[1] | 60 | 10,000 | 85 |
| Aqueous Acid Solution Foam[2] | 60 | 3,500 | 0 |
| Aqueous Foam Clean Out Fluid[1] | 60 | 10,000 | 0 |
| Aqueous Foam Clean Out Fluid[1] | 60 | 10,000 | 90 |
| Aqueous Acid Solution Foam[2] | 60 | 3,500 | 0 |
| Aqueous Foam Clean Out Fluid[1] | 60 | 10,000 | 0 |
| Aqueous Foam Clean Out Fluid[1] | 60 | 10,000 | 85 |
| Aqueous Acid Solution Foam[2] | 60 | 3,500 | 0 |
| Aqueous Foam Clean Out Fluid[1] | 60 | 30,000 | 0 |

[1] 80% quality foam formed using nitrogen gas and 2,000 gallons of fresh water having 30 pounds of hydroxyethylcellulose gelling agent per 1,000 gallons of water dissolved therein.
[2] 80% quality foam formed using nitrogen gas and 700 gallons of 15% by weight aqueous hydrochloric acid solution.
[3] Ball sealers were ⅞" diameter.

After pumping the various fluids indicated in Table I, the well was shut in for approximately 24 hours. The well was then reverse flowed to recover the clean out fluid, the perforation ball sealers, solid materials suspended in the clean out fluid and spent acid solution from the well. The well was then placed back on production and the water pump was started. As shown in FIG. 2, the treatment resulted in the restoration of the production of methane and water at rates generally higher than the rates produced before the remedial treatment.

After production was restored, production logs were run in each of the four coal seams penetrated by the well. The logs run after the treatment in each coal seam are compared with logs run before the treatment in FIGS. 3 through 6. The downflow portion of each log (speckled) shows the produced water which flows downwardly in the annulus to the bottom of the well bore from where it is pumped out of the well bore. The produced methane gas (cross-hatched) is shown in the upflow portion of the logs, and because of the downflowing water, the gas is not readily seen except in the log of the top seam (the Cobb).

The before and after production log comparisons of FIGS. 3 through 6 clearly show that the treatment of the present invention brought about an improvement in water and methane production from each of the producing zones in each of the coal seams penetrated by the well.

Thus, the present invention is well adapted to attain the ends and advantages mentioned as well as those which are inherent therein. While numerous changes may be made by those skilled in the art, such changes are encompassed within the spirit of this invention as defined by the appended claims.

What is claimed is:

1. A method of remedially treating a coal bed methane and water well to enhance the production of methane therefrom, said well penetrating one or more coal seams which include one or more producing zones communicated with said well by perforations therein comprising the steps of:
    (a) pumping a clean out fluid into said well and into said producing zones by way of said perforations;
    (b) continuing to pump said clean out fluid while adding perforation sealers thereto to thereby seal perforations and producing zones which are not plugged and to divert said clean out fluid to perforations and producing zones which are plugged by solid materials whereby at least some of said solid materials are cleaned out of said perforations and producing zones;
    (c) pumping an aqueous acid solution into said well and into said partially plugged perforations and producing zones whereby said acid solution reacts with and dissolves acid soluble solid materials in said perforations and producing zones; and
    (d) reverse flowing said clean out fluid, said perforation sealers, solid materials suspended in said clean out fluid and spent acid solution out of said well.

2. The method of claim 1 which further comprises the step of pumping additional clean out fluid into said perforations and producing zones after carrying out step (c) and before step (d).

3. The method of claim 1 wherein steps (a) through (c) are repeated prior to carrying out step (d).

4. The method of claim 1 wherein said well is shut in for a period of time after carrying step (c) and before step (d).

5. The method of claim 3 which further comprises the step of pumping additional clean out fluid into said perforations and producing zones after repeating steps (a) through (c) the last time and before carrying out step (d).

6. The method of claim 1 wherein said clean out fluid and said aqueous acid solution are gas energized aqueous fluids.

7. The method of claim 1 wherein said clean out fluid is an aqueous foam, the aqueous liquid in said foam includes a gelling agent therein and the gas in said foam is nitrogen.

8. The method of claim 1 wherein said aqueous acid solution is a foam and the gas in said foam is nitrogen.

9. The method of claim 1 wherein said aqueous acid solution is an aqueous hydrochloric acid solution.

10. A method of remedially treating a coal bed methane and water well to enhance the production of methane therefrom, said well penetrating a plurality of coal seams each of which includes one or more producing zones communicated with said well by perforations therein comprising the steps of:
   (a) pumping a clean out fluid into said well and into said producing zones by way of said perforations;
   (b) continuing to pump said clean out fluid while adding perforation sealers thereto to thereby seal perforations and producing zones which are not plugged and to divert said clean out fluid to perforations and producing zones which are plugged by solid materials whereby at least some of said solid materials are cleaned out of said perforations and producing zones;
   (c) pumping an aqueous acid solution into said well and into said partially plugged perforations and producing zones whereby said acid solution reacts with and dissolves acid soluble solid materials in said perforations and producing zones;
   (d) pumping additional clean out fluid into said partially plugged perforations and producing zones to clean out additional solid materials therefrom; and
   (e) reverse flowing said clean out fluid, said perforation sealers, solid materials suspended in said clean out fluid and spent acid solution out of said well.

11. The method of claim 10 wherein steps (a) through (c) are repeated prior to carrying out step (d).

12. The method of claim 10 wherein said well is shut in for a period of time in the range of from about 0 hours to about 24 hours after carrying out step (d) and before step (e).

13. The method of claim 10 wherein said clean out fluid and aqueous acid solution are gas energized aqueous fluids.

14. The method of claim 10 wherein said clean out fluid is an aqueous foam, the aqueous liquid in said foam includes a gelling agent therein and the gas in said foam is nitrogen.

15. The method of claim 10 wherein said aqueous acid solution is a foam and the gas in said foam is nitrogen.

16. The method of claim 10 wherein said aqueous acid solution is an aqueous hydrochloric acid solution.

17. A method of remedially treating a coal bed methane and water well to enhance the production of methane therefrom, said well penetrating a plurality of coal seams each of which includes a plurality of producing zones communicated with said well by perforations therein comprising the steps of:
   (a) pumping a gas energized aqueous clean out fluid into said well and into said producing zones by way of said perforations;
   (b) continuing to pump said gas energized aqueous clean out fluid while adding perforation sealers thereto to thereby seal perforations and producing zones which are not plugged and to divert said clean out fluid to perforations and producing zones which are plugged by solid materials whereby at least some of said solid materials are cleaned out of said perforations and producing zones;
   (c) pumping a gas energized aqueous acid solution into said well and into said partially plugged perforations and producing zones whereby said acid solution reacts with and dissolves acid soluble solid materials in said perforations and producing zones;
   (d) pumping additional gas energized clean out fluid into said partially plugged perforations and producing zones to clean out additional solid materials therefrom;
   (e) shutting in said well for a period of time in the range of from about 0 hours to about 24 hours; and
   (f) reverse flowing said clean out fluid, said perforation sealers, solid materials suspended in said clean out fluid and spent acid solution out of said well.

18. The method of claim 17 wherein steps (a) through (c) are sequentially repeated at least three times prior to carrying out step (d).

19. The method of claim 18 wherein said gas energized aqueous clean out fluid is a foam, said aqueous liquid in said foam includes a gelling agent therein and the gas in said foam is nitrogen.

20. The method of claim 19 wherein said aqueous acid solution is a foam, the aqueous acid solution in said foam is an aqueous hydrochloric acid solution and the gas in said foam is nitrogen.

* * * * *